US009886687B2

(12) United States Patent
Dang et al.

(10) Patent No.: US 9,886,687 B2
(45) Date of Patent: Feb. 6, 2018

(54) METHOD AND APPARATUS FOR DIGITAL RIGHTS MANAGEMENT

(75) Inventors: Ya Bin Dang, Beijing (CN); Bo Feng, Beijing (CN); Ling Shao, Beijing (CN); Rong Yan, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1126 days.

(21) Appl. No.: 13/611,394

(22) Filed: Sep. 12, 2012

(65) Prior Publication Data

US 2013/0007894 A1  Jan. 3, 2013

Related U.S. Application Data

(62) Division of application No. 11/821,985, filed on Jun. 26, 2007.

(30) Foreign Application Priority Data

Jun. 26, 2006 (CN) .......................... 2006 1 0094699

(51) Int. Cl.
*G06Q 20/00* (2012.01)
*G06Q 20/20* (2012.01)
(Continued)

(52) U.S. Cl.
CPC .......... *G06Q 20/203* (2013.01); *G06F 21/10* (2013.01); *G06F 21/105* (2013.01); *G06F 21/31* (2013.01);
(Continued)

(58) Field of Classification Search
USPC .......................................................... 705/65
See application file for complete search history.

(56) References Cited

U.S. PATENT DOCUMENTS 7,073,063 B2    7/2006   Peinado
7,386,891 B2    6/2008   Peinado
(Continued)

FOREIGN PATENT DOCUMENTS

EP    1293857 A1    3/2003

OTHER PUBLICATIONS

Open Mobile Alliance, "ORM Specification-Candidate Version 2.0 (OMA-DRM-DRMOV2_0-20040716-C)", http://www.openmobilealliance.org, Jul. 16, 2004, pp. 1-146.

(Continued)

*Primary Examiner* — John Hayes
*Assistant Examiner* — John M Winter
(74) *Attorney, Agent, or Firm* — Cantor Colburn LLP; David Quinn

(57) ABSTRACT

A method and apparatus for digital rights management (DRM) with steps and means for receiving a registration request from one of a plurality of DRM agent devices requesting to register one of a plurality of user accounts and the one DRM agent device to one of a plurality of rights issuers, completing a registration process in the one rights issuer, including establishment of a relationship among the one user account, the one DRM agent device and the one rights issuer; and returning a registration completion response to the one DRM agent device. The invention provides support to the many-to-many relationships among DRM entities, such as DRM agent device, user account and rights issuer, so that the DRM system can be applied to more business modes.

3 Claims, 5 Drawing Sheets

(51) Int. Cl.
*G06F 21/10* (2013.01)
*G06F 21/31* (2013.01)
*H04L 29/06* (2006.01)
*H04L 29/08* (2006.01)

(52) U.S. Cl.
CPC ............ *H04L 63/08* (2013.01); *H04L 67/306* (2013.01); *G06F 2221/2101* (2013.01); *G06F 2221/2117* (2013.01); *G06F 2221/2135* (2013.01); *G06F 2221/2137* (2013.01); *H04L 2463/101* (2013.01)

(56) References Cited

U.S. PATENT DOCUMENTS

| | | | |
|---|---|---|---|
| 7,870,397 | B2 | 1/2011 | Lee |
| 2002/0013772 | A1 | 1/2002 | Peinado |
| 2004/0093523 | A1 | 5/2004 | Matsuzaki |
| 2004/0254888 | A1* | 12/2004 | Tanaka .................. G06F 21/121 705/59 |
| 2004/0267946 | A1 | 12/2004 | Caplin et al. |
| 2004/4267946 | | 12/2004 | Caplin |
| 2005/0071280 | A1* | 3/2005 | Irwin .................... H04L 9/0825 705/59 |
| 2005/0114896 | A1 | 5/2005 | Hug et al. |
| 2005/0216739 | A1 | 9/2005 | Lee |
| 2006/0036554 | A1* | 2/2006 | Schrock .................. G06F 21/10 705/75 |
| 2006/0059102 | A1 | 3/2006 | Ebihara |
| 2006/0073890 | A1 | 4/2006 | McAllister |
| 2006/0123484 | A1 | 6/2006 | Babic et al. |
| 2007/0061886 | A1 | 3/2007 | Le |

OTHER PUBLICATIONS

Pat Murphy, "vb-one time password", http://en.allexperts.com/qNisual-Basoc-1048/vb-time-password-4.htm; Feb. 18, 2008, 1-3.

* cited by examiner

METHOD AND APPARATUS FOR DIGITAL RIGHTS MANAGEMENT

FIELD OF THE INVENTION

The present invention relates to digital rights management (DRM) and, more particularly, to a method and an apparatus of registering/deregistering a DRM agent device in a DRM system and a DRM agent device.

BACKGROUND OF THE INVENTION

With the rapid development of the Internet and digitization technologies, there are more and more digital contents for online transaction, such as electronic books, electronic newspapers, music, movies, pictures, games and software. However, since digital contents are subject to copy and propagation, digital contents for online transaction are confronted with a large quantity of piracies and infringements, which jeopardize the interests of digital content owners and dampens their enthusiasm for expanding business via the Internet. Thus, it gets increasingly important to protect the copyright of digital contents.

The DRM technology has received more importance in recent years, and there is an ever growing increase in DRM protected digital contents. As a result, the value-added service of digital contents can be accomplished. For example, while publishing paper books, publishing houses can gain more earnings from online sales of electronic books via a DRM system.

FIG. 1 depicts a general architecture of a DRM system 100. System 100 comprises a content distributor 110, a rights issuer 120, a consumer 130 and a mastering center 140. Mastering center 140 holds the protected digital contents and the rights of the contents. Content distributor 110 acquires intended distributing digital content and provides a distribution mechanism of the content. Rights issuer 120 is responsible for managing registering consumer 130, authenticating consumer 130, receiving a license (rights object) request related to the digital content from consumer 130, generating a license for the digital content, sending the license to consumer 130 and recording the consumption of the license of consumer 130. Consumer 130 acquires downloadable or streaming content from content distributor 110 and requests rights issuer 120 for a license of the corresponding content so as to use the protected content. Consumer 130 must have digital content presentation tools (such as computer, mobile phone, personal digital assistant (PDA) and the like, having a player, reader and the like.) that support DRM, which tools decrypt digital content from content distributor 110 by using the license from rights issuer 120, so as to represent the digital content. During the process of content distribution and authentication, content distributor 110 and rights issuer 120 need to communicate with mastering center 140. More specifically, mastering center 140 provides content distributor 110 with protected digital content and provides rights issuer 120 with usage rules of the digital content.

In the traditional DRM system, the DRM agent device, namely the user device, such as computer, mobile phone and set-top box, and the user account are treated as the same entity, and the account is valid only for one rights issuer. It is unreasonable for many business modes, for example, IPTV. On one hand, the user might use more than one DRM agent device by the same account, and one DRM agent device may be used by more than one user with their accounts. On the other hand, in the DRM system, one account should be supported by more than one rights issuer.

SUMMARY OF THE INVENTION

Therefore, it is an object of the present invention to meet the above demands in the prior art, supporting many-to-many relationships among DRM entities in a DRM system, wherein the DRM entities include DRM agent device, user account, rights issuer and the like.

According to a first aspect of the present invention, provided is a method for digital rights management, comprising the steps of: receiving a registration request from one of a plurality of DRM agent devices, said registration request being used for requesting to register one of a plurality of user accounts and said one DRM agent device to one of a plurality of rights issuers; in response to said registration request, completing a registration process in said one rights issuer, including establishment of a relationship among said one user account, said one DRM agent device and said one rights issuer; and returning a registration completion response to said one DRM agent device.

In the above method, said step of completing a registration process comprises the steps of: validating said one DRM agent device; and authenticating said one user account.

In the above method, when a plurality of DRM agent devices are bound to one user account under one rights issuer, said one user account is treated as an OMA (open mobile alliance) domain.

In the above method, said step of completing a registration process comprises the step of terminating said registration process if the number of DRM agent devices registered with said one user account is larger than or equal to a pre-determined value.

In the above method, further comprised is the step of updating a rights object space defined by user accounts, DRM agent devices and contents with respect to said rights issuer.

In the above method, further comprised are the steps of: receiving a request for content rights object acquisition from the one DRM agent device; searching said rights object space for said content rights object; and returning said content rights object to said DRM agent device in case that said content rights object is found.

According to a second aspect of the present invention, provided is a method for digital rights management, comprising the steps of: receiving a deregistration request from one of a plurality of DRM agent device, said deregistration request being used for requesting to deregister one of a plurality of user accounts and said one DRM agent device from one of a plurality of rights issuers; in response to said deregistration request, completing a deregistration process in said one rights issuer, including removal of a relationship among said one user account, said one DRM agent device and said one rights issuer; and returning a deregistration completion response to said one DRM agent device.

In the above method, said step of completing a deregistration process comprises the steps of: validating said one DRM agent device; and authenticating said one user account.

In the above method, when a plurality of DRM agent devices are bound to one user account under one rights issuer, said one user account is treated as an OMA domain.

In the above method, said step of completing a deregistration process comprises the step of terminating said deregistration process if the deregistration times of said DRM agent device under said one user account is larger than or equal to a pre-determined value.

In the above method, further comprised is the step of updating a rights object space defined by user accounts, DRM agent devices and contents with respect to said rights issuer.

According to a third aspect of the present invention, provided is an apparatus for digital rights management, comprising: a context memory for storing an established relationship among a user account, a DRM agent device and a rights issuer; a receiver for receiving a registration request from one of a plurality of DRM agent devices, said registration request being used for requesting to register one of a plurality of user accounts and said one DRM agent device to one of a plurality of rights issuers; a register for, in response to said registration request, completing a registration process in said one rights issuer, including establishment of a relationship among said one user account, said one DRM agent device and said one rights issuer and storing said relationship to said context memory; and a sender for returning a registration completion response to said one DRM agent device.

In the above apparatus, said register comprises: a validator for validating said one DRM agent device; and an authenticator for authenticating said one user account.

In the above apparatus, when a plurality of DRM agent devices are bound to one user account under one rights issuer, said one user account is treated as an OMA domain.

In the above apparatus, said register terminates said registration process if the number of DRM agent devices registered with said one user account is larger than or equal to a pre-determined value.

In the above apparatus, further comprised is a rights object space memory for storing a rights object space defined by user accounts, DRM agent devices and contents with respect to said one rights issuer.

In the above apparatus, said receiver is further used for receiving a request for content rights object acquisition from the one DRM agent device, and said sender is further used for returning said content rights object to said DRM agent device in case that said content rights object exists in said rights object space memory.

In the above apparatus, said receiver is further used for receiving a deregistration request from one of a plurality of DRM agent device, said deregistration request being used for requesting to deregister one of a plurality of user accounts and said one DRM agent device from one of a plurality of rights issuers; said register is further used for, in response to said deregistration request, completing a deregistration process in the one rights issuer, including removal of a relationship among said one user account, said one DRM agent device and said one rights issuer and updating of said context memory; and said sender is further used for returning a deregistration completion response to said one DRM agent device.

In the above apparatus, said validator and said authenticator also work during said deregistration process.

In the above apparatus, said register terminates said deregistration process if the deregistration times of said DRM agent device under said one user account is larger than or equal to a pre-determined value.

According to a fourth aspect of the present invention, provided is a method for digital rights management, comprising the steps of: sending a registration request to one of a plurality of rights issuers, said registration request being used for requesting to register one of a plurality of user accounts and one of a plurality of DRM agent devices to said one right issuer; and establishing in the local relationship among said one user account, said one DRM agent device and said one rights issuer if a registration completion response is received from said one rights issuer.

In the above method, when a plurality of DRM agent devices are bound to one user account under one rights issuer, said one user account is treated as an OMA domain.

In the above method, further comprised are the steps of: sending to said one rights issuer a request for content rights object acquisition; and updating a rights object space stored in the local in the case that said content rights object is received.

According to a fifth aspect of the present invention, provided is a method for digital rights management, comprising the steps of: sending a deregistration request to one of a plurality of rights issuers, said deregistration request being used for requesting to deregister one of a plurality of user accounts and one of a plurality of DRM agent devices from said one rights issuer; and removing in the local relationship among said one user account, said one DRM agent device and said one rights issuer if a deregistration completion response is received from said one rights issuer.

In the above method, when a plurality of DRM agent devices are bound to one user account under one rights issuer, said one user account is treated as an OMA domain.

According to a sixth aspect of the present invention, provided is an apparatus for digital rights management, comprising: a sender for sending a registration request to one of a plurality of rights issuers, said registration request being used for requesting to register one of a plurality of user accounts and one of a plurality of DRM agent devices to said one rights issuer; and a receiver for establishing in the local relationship among said one user account, said one DRM agent device and said one rights issuer after a registration completion response is received from said one rights issuer.

In the above apparatus, when a plurality of DRM agent devices are bound to one user account under one rights issuer, said one user account is treated as an OMA domain.

In the above apparatus, said sender is further used for sending to said one rights issuer a request for content rights object acquisition; and said receiver is further used for updating a rights object space stored in the local after said content rights object is received.

In the above apparatus, said sender is further used for sending a deregistration request to one of a plurality of rights issuers, said deregistration request being used for requesting to deregister one of a plurality of user accounts and one of a plurality of DRM agent devices from said one rights issuer; and said receiver is further used for removing in the local relationship among said one user account, said one DRM agent device and said one rights issuer in case that a deregistration completion response is received form said one rights issuer.

The method/apparatus (e.g. a rights issuer server and a DRM agent device) for digital rights management according to the present invention provides support to the many-to-many relationships among DRM entities, such as DRM agent device, user account and rights issuer, so that the DRM system can be applied to more business modes, e.g., IPTV.

BRIEF DESCRIPTION ON THE DRAWINGS

Other objects and effects of the present invention will become more apparent and easier to understand by reference to the following detailed description taken in conjunction with the accompanying drawings, in which.

Like reference numerals designate the same, similar or corresponding features or functions throughout the figures.

DESCRIPTION OF THE PREFERRED EMBODIMENTS

Preferred embodiments of the present invention will be described hereinafter.

The basic idea of the present invention is to support the many-to-many relationships among DRM entities in a DRM system, wherein the DRM entities include DRM agent device, user account, rights issuer and the like.

In the present invention, relationships among user accounts, DRM agent devices and rights issuers are established through registration. Before a user account requests the rights object for a protected content from a rights issuer via a DRM agent device, the user account and the DRM agent device should register to one of a plurality of rights issuers, so that a relationship among the user account, the DRM agent device and the rights issuer can be established in the DRM agent device and the rights issuer. Thus, the rights object for a protected content can be acquired by requesting the rights issuer for the rights object when needed.

In the present invention, a relationship among user accounts, DRM agent devices and rights issuers can be eliminated through deregistration.

Figure 1:
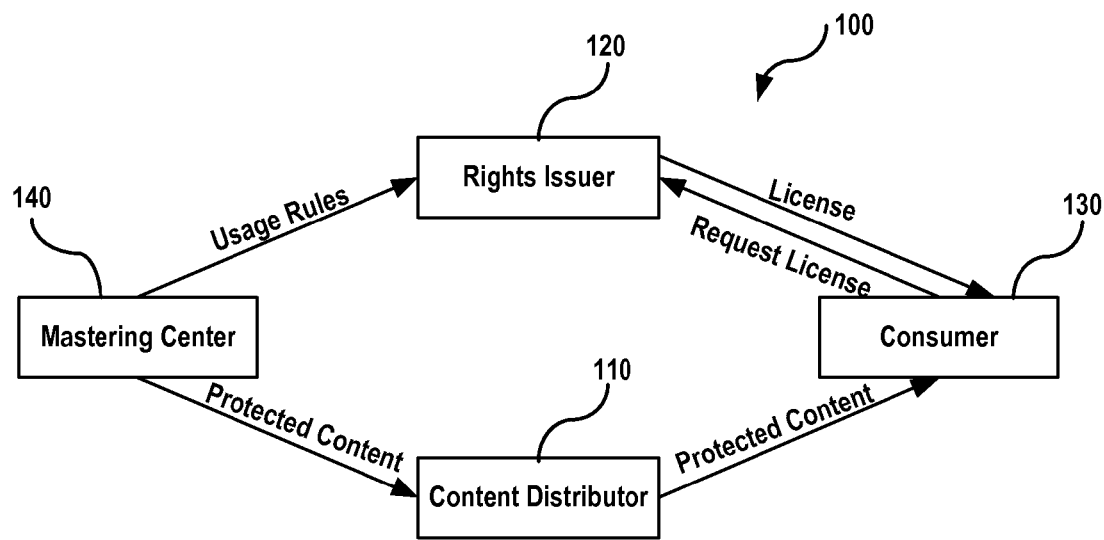
FIG. 1 depicts a general architecture of DRM system 100.
Figure 2:
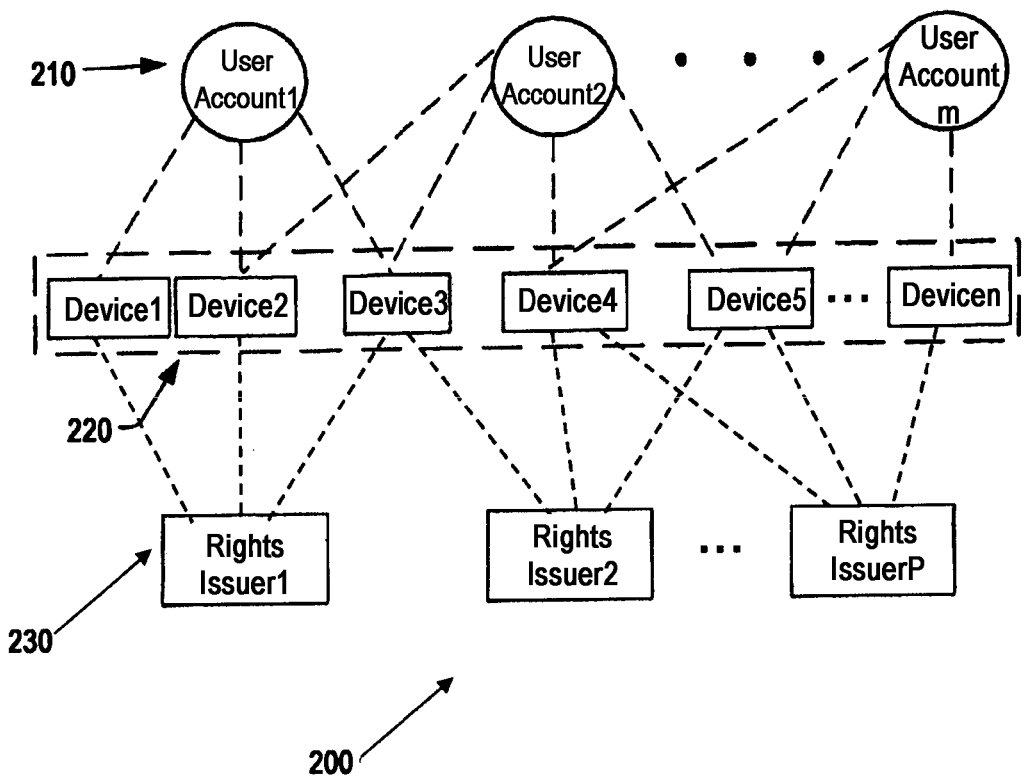
FIG. 2 depicts a DRM system 200 in which the present invention may be implemented.

FIG. 2 depicts a DRM system 200 in which the present invention can be implemented. As shown in FIG. 2, the DRM system comprises user accounts 210, DRM agent devices 220 and rights issuers 230. Here, the figure schematically depicts that the DRM system 200 comprises m user accounts, n DRM agent devices and p rights issuers, in which m, n and p are all positive integers. User accounts and users can be in a one-to-one relationship or in many-to-many relationships. Examples of DRM agent devices comprise computer, PDA, set-top box and the like. Rights issuers can comprise servers on the Internet and can have identifiers, such as IP address, domain name or other identifier capable of uniquely identifying a rights issuer. In the present invention, a relationship among any one of user accounts, any one of DRM agent devices and any one of rights issuers can be established, so as to establish contexts among them.

Hereinafter, description will be given to an implementation of the present invention, that is, to realize supporting the many-to-many relationships among DRM entities in a DRM system, by extending Open Mobile Alliance (OMA) DRM protocol—rights object acquisition protocol (ROAP).

Those skilled in the art can understand that such extensions are effective and OMA compliant since only some compliant extensions are added into the ROAP protocol and no private protocol message is introduced. These extensions can be ignored by other OMA compliant devices.

Of course, those skilled in the art can understand that other DRM systems, such as Microsoft DRM, Sun Open DRM, Real DRM and the like, with extensions, can also be utilized to support the many-to-many relationships among DRM entities in a DRM system of the present invention.

To those skilled in the art, an understanding of the following messages can be obtained by making reference to the ROAP protocol.

Figure 3:
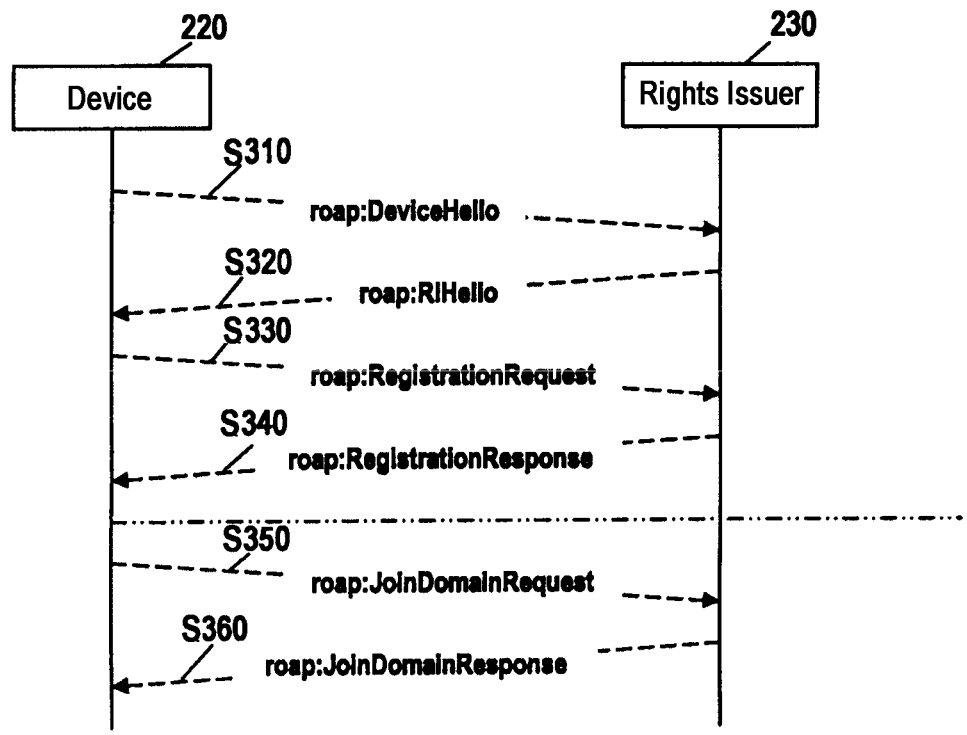
FIG. 3 depicts a signal flow view during a registration process according to an embodiment of the present invention.

FIG. 3 depicts a signal flow view of a registration process according to an embodiment of the present invention. As shown in FIG. 3, the registration process comprises six steps between any one of the DRM agent devices 220 and any one of the rights issuers 230. In the present embodiment, OMA DRM 4-pass (steps S310-340) Registration Protocol and 2-pass (steps S350-360) Join Domain Protocol are utilized to implement the registration process.

First, a DRM agent device sends to an intent rights issuer a roap:DeviceHello message (step S310).

When a user wishes to register his/her user account and a DRM agent device to a rights issuer, he/she may input the user account and password into the DRM agent device and click for example a registration button, and then the registration process is triggered. Thus, the DRM agent device sends to the intent rights issuer a roap:DeviceHello message.

The following codes depict an example of the roap:DeviceHello message:

```
<?xml version="1.0" encoding="utf-8"?>
<roap:deviceHello
    xmlns:roap="urn:oma:bac:dldrm:roap-1.0"
    xmlns:xsi="http://www.w3.org/2001/XMLSchema-instance">
        <version>1.0</version>
        <deviceID>
            <keyIdentifier xsi:type="roap:X509SPKIHash">
                <hash>vXENc+Um/9/NvmYKiHDLaErK0gk=</hash>
            </keyIdentifier>
        </deviceID>
        <extensions>
            <extension xsi:type="roap:CertificateCaching"/>
            <extension xsi:type="roap:RIID">
```

```
        <riID>
            <keyIdentifier xsi:type="roap:X509SPKIHash">
                <hash>aXENc+Um/9/NvmYKiHDLaErK0fk=</hash>
            </keyIdentifier>
        </riID>
    </extension>
</extensions>
</roap:deviceHello>
```

In which the italic part denotes extensions implemented in the present embodiment. As seen from the above codes, the conventional roap:DeviceHello message comprises version, device ID of the DRM agent device and extensions. Generally, each DRM agent device has a device ID which is named and written in by the manufacturer of the DRM agent device. In the present embodiment, extensions of the raop:DeviceHello message further comprise ID of the intent rights issuer, just as denoted by the boldface part, designating the rights issuer to which the user requests to register.

Of course, those skilled in the art should understand that rights issuer's ID may not be needed. For example, if a user wishes to register the user account and the DRM agent device to all rights issuers, there is no need for rights issuer's ID. Or, if the user does not know ID of the intent rights issuer, there is also no need for the rights issuer's ID, and he/she can make a selection in the following steps as to which one is the intent rights issuer.

The roap:DeviceHello message together with other messages to be described below can be transmitted in the form of broadcast, multicast, unicast and a combination thereof.

Upon receipt of the roap:DeviceHello message, the intent rights issuer sends to the DRM agent device a roap:RIHello message (step S320) to report some information.

The following codes depict an example of the roap:RIHello message:

```
<?xml version="1.0" encoding="utf-8"?>
<roap:riHello
    xmlns:roap="urn:oma:bac:dldrm:roap-1.0"
    xmlns:xsi="http://www.w3.org/2001/XMLSchema-instance"
    status="Success" sessionId="433211">
    <selectedVersion>1.0</selectedVersion>
    <riID>
        <keyIdentifier xsi:type="roap:X509SPKIHash">
            <hash>aXENc+Um/9/NvmYKiHDLaErK0fk=</hash>
        </keyIdentifier>
    </riID>
    <riNonce>dsaiuiure9sdwerfqwer</riNonce>
    <trustedAuthorities>
        <keyIdentifier xsi:type="roap:X509SPKIHash">
            <hash>bew3e332oihde9dwiHDLaErK0fk=</hash>
        </keyIdentifier>
        <keyIdentifier xsi:type="roap:X509SPKIHash">
            <hash>31kpoi9fceoiuoift45epokifc0poiss</hash>
        </keyIdentifier>
    </trustedAuthorities>
    <extensions>
        <extension xsi:type="roap:CertificateCaching"/>
    </extensions>
</roap:riHello>
```

As seen from the above codes, the raop:RIHello message comprises status, session ID, selected version, Right Issuer (RI) ID, RI nonce, trusted device authorities and extensions.

In the present embodiment, the raop:RIHello message is not extended. It should be noted that the above codes contain session ID. Here, the session ID is 433211 and is needed and will not be changed in the following steps of the registration process.

Then, the DRM agent device sends to the intent rights issuer a ropa:RegistrationRequest message (step S330).

The following codes depict an example of the roap:RegistrationRequest message:

```
<?xml version="1.0" encoding="utf-8"?>
<roap:registrationRequest
    xmlns:roap="urn:oma:bac:dldrm:roap-1.0"
    xmlns:xsi="http://www.w3.org/2001/XMLSchema-instance"
    sessionId="433211">
    <nonce>32efd34de39sdwefqwer</nonce>
    <time>2004-03-17T14:20:00Z</time>
    <certificateChain>
        <certificate>miib123121234567</certificate>
        <certificate>miib234124312431</certificate>
    </certificateChain>
    <trustedAuthorities>
        <keyIdentifier xsi:type="roap:X509SPKIHash">
            <hash>432098mhj987fdlkj98lkj098lkjr409</hash>
        </keyIdentifier>
        <keyIdentifier xsi:type="roap:X509SPKIHash">
            <hash>432098ewew5jy6532fewfew4f43f3409</hash>
        </keyIdentifier>
    </trustedAuthorities>
    <signature>321ue3ue3ue10ue2109ue1ueoidwoijdwe309u09ueqijdwqijdwq09
        uwqwqi009</signature>
</roap:registrationRequest>
```

As seen from the above codes, the roap:RegistrationRequest message comprises: session ID, device nonce, request time, device certificate chain, trusted RI authorities, extensions (the roap:RegistrationRequest is not extended in the present example) and signature.

It should be noted that the message contains request time, as denoted by the boldface part, which is helpful in calculating the term of validity of registration. Additionally, the message contains device certificate chain, as denoted by the italic part, which can be used for authenticating the DRM agent device. Moreover, it should be noted that the roap:RegistrationRequest message contains signature to guarantee the message's integrity and reliability.

Upon receipt of the roap:RegistrationRequest message, the intent rights issuer sends to the DRM agent device a roap:RegistrationResponse message (step S340) to report some information.

The following codes depict an example of the roap:RegistrationResponse message:

```
<?xml version="1.0" encoding="utf-8"?>
<roap:registrationResponse
    xmlns:roap="urn:oma:bac:dldrm:roap-1.0"
    xmlns:xsi="http://www.w3.org/2001/XMLSchema-instance"
    status="Success" sessionId="433211" riURL="www.anyRI.com/register">
        <riURL>http://ri.example.com/roap.cgi</riURL>
        <certificateChain>
            <certificate>MIIB223121234567</certificate>
            <certificate>MIIB834124312431</certificate>
        </certificateChain>
        <ocspResponse>fdow9rw0feijfdsojr3w09u3wijfdslkj4sd</ocspResponse>
        <signature>321ue3ue3ue10ue2109ue1ueoidwoijdwe309u09ueqijdwqijdwq09
        uwqwqi009</signature>
</roap:registrationResponse>
```

As seen from the above codes, the roap:RegistrationResponse message comprises: status, session ID, RI URL, RI certificate chain, online certificate status protocol (OCSP) response, extensions (the roap:RegistrationResponse is not extended in the present example) and signature.

It should be noted that the message contains RI URL, as denoted by the boldface part. Moreover, it should be noted that the roap:RegistrationResponse message contains signature to guarantee the message's integrity and reliability.

Subsequently, the DRM agent device sends a roap:JoinDomainRequest message (step S350) to the intent rights issuer.

The following codes depict an example of the roap:JoinDomainRequest message:

```
<?xml version="1.0" encoding="utf-8"?>
<roap:joinDomainRequest
    xmlns:roap="urn:oma:bac:dldrm:roap-1.0"
    xmlns:xsi="http://www.w3.org/2001/XMLSchema-instance">
        <deviceID>
            <keyIdentifier xsi:type="roap:X509SPKIHash">
                <hash>vXENc+Um/9/NvmYKiHDLaErK0gk=</hash>
            </keyIdentifier>
        </deviceID>
        <riID>
            <keyIdentifier xsi:type="roap:X509SPKIHash">
                <hash>aXENc+Um/9/NvmYKiHDLaErK0fk=</hash>
            </keyIdentifier>
        </riID>
        <nonce>32efd34de39sdwefqwer</nonce>
        <time>2004-03-17T14:20:00Z</time>
        <domainID>Peter001CN-001</domainID>
        <certificateChain>
            <certificate>miib123121234567</certificate>
            <certificate>miib234124312431</certificate>
        </certificateChain>
        <extensions>
            <extension xsi:type="roap:SessionID">
                <sessonID>433211</sessonID>
            </extension>
            <extension xsi:type="roap:PasswordHash">
```

```
            <hash>41ebHkfyc1KfD5KUU+k5po7en9E=</hash>
        </extension>
    </extensions>
    <signature>321ue3ue3ue10ue2109ue1ueoidwoijdwe309u09ueqijdwqijdwq09
    uwqwqi009</signature>
</roap:joinDomainRequest>
```

As seen from the above codes, the roap: JoinDomainRequest message comprises: device ID, RI ID, device nonce, request time, domain identifier (user account), device certificate chain, extensions and signature.

It should be noted that in the present embodiment, the user account is treated as the OMA domain, so that if a plurality of DRM agent devices are bound to said user account under a rights issuer respectively, same as taking part into a domain.

In the present embodiment, the roap:JoinDomainRequest message is extended, where the italic part denotes extensions implemented in the present embodiment. It can be seen that the extensions implemented comprise: session ID for identifying the registration process, which is identical to that in the preceding roap:RegistrationResponse message and is 433211 here; and user password hash for authenticating the user account.

Upon receipt of the roap:JoinDomainRequest message, the rights issuer authenticates the user account with the user password hash in the message. After the successful authentication, the rights issuer registers the DRM device to the user account in the case that conditions are met. In other words, a relationship among the user account, the DRM agent device and the rights issuer is established therein. It should be understood that the validation of the DRM agent device with the device information, such as the device certificate chain, is successful.

The above conditions mean that there can be a maximum threshold for the number of registered DRM agent devices under a user account, and that only when the number of the registered DRM agent devices under the user account is smaller than the threshold, will a new DRM agent device be accepted. Different user accounts can share different maximum numbers of registrable DRM agent devices. After the number of the registered DRM agent devices has reached the maximum threshold, if the user account wants to have a new DRM agent device to be registered, first of all, deregistration operation on existing DRM agent devices, which will be described below, must be performed at least once.

Afterwards, the rights issuer confirms completion of the registration to the DRM agent device, i.e. sends a roap: JoinDomainReponse message to the DRM agent device (step S360).

The following codes depict an example of the roap: JoinDomainResponse message:

```
<?xml version="1.0" encoding="utf-8"?>
<roap:joinDomainResponse
    xmlns:roap="urn:oma:bac:dldrm:roap-1.0"
    xmlns:ds="http://www.w3.org/2000/09/xmldsig#"
    xmlns:xenc="http://www.w3.org/2001/04/xmlenc#"
    xmlns:xsi="http://www.w3.org/2001/XMLSchema-instance"
    status="Success">
        <deviceID>
            <keyIdentifier xsi:type="roap:X509SPKIHash">
                <hash>vXENc+Um/9/NvmYKiHDLaErK0gk=</hash>
            </keyIdentifier>
        </deviceID>
        <riID>
            <keyIdentifier xsi:type="roap:X509SPKIHash">
                <hash>aXENc+Um/9/NvmYKiHDLaErK0fk=</hash>
            </keyIdentifier>
        </riID>
        <nonce>32efd34de39sdwefqwer</nonce>
        <domainInfo>
            <notAfter>2004-12-22T03:02:00Z</notAfter>
            <domainKey>
                <encKey Id="Peter001CN-001">
                    <xenc:EncryptionMethod
    Algorithm="http://www.rsasecurity.com/rsalabs/pkcs/schemas/pkc
    s-1#rsaes-kem-kdf2-kw-aes128"/>
                    <ds:KeyInfo>
                        <roap:X509SPKIHash>
                            <hash>vXENc+Um/9/NvmYKiHDLaErK0gk=
                            </hash>
                        </roap:X509SPKIHash>
                    </ds:KeyInfo>
                    <xenc:CipherData>
<xenc:CipherValue>231jks231dkdwkj3jk321kj321j321kj423j342h213j321jh
321jh2134jhk3211fdslfdsopfespjoefwopjsfdpojvct4w925342a
</xenc:CipherValue>
                    </xenc:CipherData>
                </encKey>
            <riID>
                <keyIdentifier xsi:type="roap:X509SPKIHash">
                    <hash>aXENc+Um/9/NvmYKiHDLaErK0fk=
```

```
            </hash>
          </keyIdentifier>
        </riID>
        <mac>ewqrewoewfewohffohr3209832r3</mac>
      </domainKey>
    </domainInfo>
    <certificateChain>
      <certificate>MIIB223121234567</certificate>
      <certificate>MIIB834124312431</certificate>
    </certificateChain>
    <ocspResponse>miibewqoidpoidsa</ocspResponse>
    <extensions>
      <extension xsi:type="roap:SessionID">
        <sessonID>433211</sessonID>
      </extension>
      <extension xsi:type="roap:RegistrationInfo">
        <RegistrationNo>325746401418</RegistrationNo>
        <RegistrationTime>2004-03-17T14:00Z
        </RegistrationTime>
      </extension>
    </extensions>
    <signature>d93e5fue3ue10ue2109ue1ueoidwoijdwe309u09ueqijdwqijdwq09
      uwqwqi009</signature>
</roap:joinDomainResponse>
```

As seen from the above codes, the roap:JoinDomainResponse message comprises: status, device ID, RI ID, device nonce, domain info (user account information), RI certificate chain, OCSP response, extensions and signature.

In the present embodiment, the roap:JoinDomainResponse message is extended, where the italic part denotes extensions implemented in the present embodiment. It can be seen that the extensions implemented comprise: session ID for identifying the registration process, which is identical to that in the preceding roap:JoinDomainRequest message and is 433211 here; some registration information, including registration number, registration time and the like, just as denoted by the boldface part.

Additionally, it should be noted that the roap:JoinDomainResponse message comprises a new password for authenticating the user account, which is different from the old password described previously, as denoted by the part in different font.

Upon receipt of the roap:JoinDomainResponse message, the DRM agent device can also establish a relationship among the user account, the DRM agent device and the rights issue in the local.

The following codes depict an example of the registration information (context) in the DRM agent device:

```
<ODCP20_SystemInfo>
  <CACertficate>MIICjjCCAfegAwIBAgIBADANBgkqhkiG9w0
  </CACertficate>
  <certificateChain>
    <certificate>miib123121234567</certificate>
    <certificate>miib234124312431</certificate>
  </certificateChain>
  <User ID="Peter001CN-001">
    <Password>
      <hash>41ebHkfyc1KfD5KUU+k5po7en9E=</hash>
    </Password>
    <AccessTime>2004-03-17T14:30:00Z</AccessTime>
    <RightsIssuer riID="aXENc+Um/9/NvmYKiHDLaErK0fk=">
      <RIURL>http://ri.example.com/roap.cgi</RIURL>
      <version>1.0</version>
      <USK>yR707KOCF3YkS9Kf82/iDF7Wy</USK>
      <RegistrationNo>325746401418</RegistrationNo>
      <RegistrationTime>2004-03-17T14:20:00Z
      </RegistrationTime>
      <ExpirationTime>2004-12-22T03:02:00Z</ExpirationTime>
      <certificateChain>
        <certificate>MIIB223121234567</certificate>
        <certificate>MIIB834124312431</certificate>
      </certificateChain>
    </RightsIssuer>
  </User>
</ODCP20_SystemInfo>
```

As seen from the above codes, each of the DRM agent devices can be registered with a plurality of user accounts, and each user account can be registered with a plurality of rights issuers.

Those skilled in the art can understand that the registration information in the rights issuer is similar to that in the DRM agent device described previously.

When relationships among a plurality of user accounts, DRM agent devices and the rights issuer is established in the rights issuer, the rights issuer can build rights object spaces associated with user accounts, DRM agent devices and contents with respect to the rights issuer, just as described below.

Figure 4:
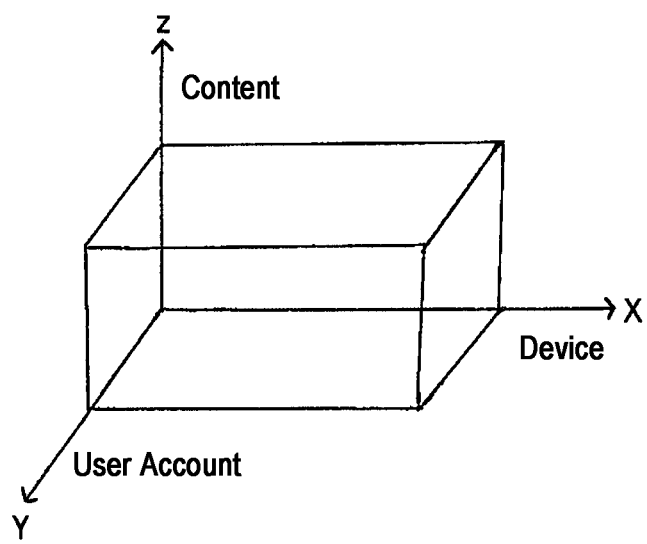
FIG. 4 depicts a 3D rights object space according to an embodiment of the present invention.

FIG. 4 depicts a 3D rights object space according to an embodiment of the present invention, in which axis X denotes DRM agent device, axis Y denotes user account and axis Z denotes content. The space vividly presents a relationship among the user account, DRM agent device, content and rights object. A rights object can be determined uniquely as long as the user account, DRM agent device and content are determined.

Figure 5:
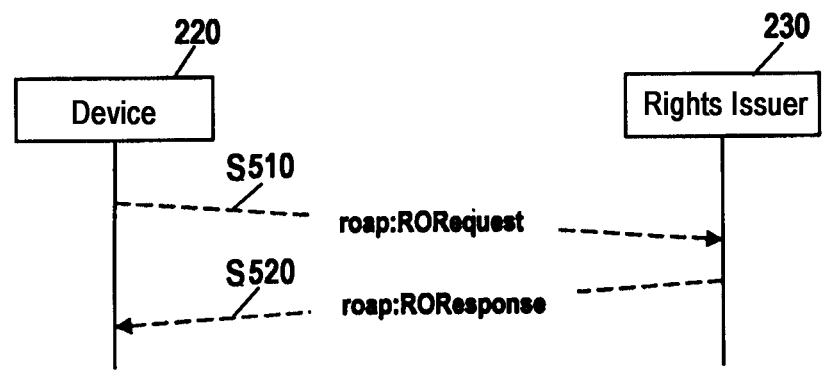
FIG. 5 depicts a signal flow view of rights object acquisition according to an embodiment of the present invention.

FIG. 5 depicts a signal flow view of rights object acquisition according to an embodiment of the present invention. As shown in FIG. 5, the process comprises two steps between one of the DRM agent devices 220 and one of the rights issuers 230. In the present embodiment, OMA 2-pass Rights Object Acquisition Protocol is utilized to implement the process.

First, a DRM agent device sends to a rights issuer a roap:RORequest message (step S510).

The following codes depict an example of the roap:RORequest message:

```xml
<?xml version="1.0" encoding="utf-8"?>
<roap:roRequest
    xmlns:roap="urn:oma:bac:dldrm:roap-1.0"
    xmlns:xsi="http://www.w3.org/2001/XMLSchema-instance">
        <deviceID>
            <keyIdentifier xsi:type="roap:X509SPKIHash">
                <hash>vXENc+Um/9/NvmYKiHDLaErK0gk=</hash>
            </keyIdentifier>
        </deviceID>
        <riID>
            <keyIdentifier xsi:type="roap:X509SPKIHash">
                <hash>aXENc+Um/9/NvmYKiHDLaErK0fk=</hash>
            </keyIdentifier>
        </riID>
        <domainID>Peter001CN-001</domainID>
        <nonce>32efd34de39sdwefqwer</nonce>
        <time>2004-03-17T14:30:00Z</time>
        <roInfo>
            <roID>n8yu98hy0e2109eu09ewf09u</roID>
        </roInfo>
        <certificateChain>
            <certificate>miib123121234567</certificate>
            <certificate>miib234124312431</certificate>
        </certificateChain>
        <extensions>
            <extension xsi:type="roap:ContentID">
                <contentID>CN1000234</contentID>
            </extension>
            <extension xsi:type="roap:USKHMAC">
                <uskhmac>cajnDaqdf3/437fnACcagpu+faW=</uskhmac>
            </extension>
        </extensions>
        <signature>321ue3ue3ue10ue2109ue1ueoidwoijdwe309u09ueqijdwqijdwq09
        uwqwqi009</signature>
</roap:roRequest>
```

As seen from the above codes, the roap:RORequest message comprises: device ID, RI ID, domain ID (user account), device nonce, rights object (RO) request time, RO info, device certificate chain, extensions and signature.

In the present embodiment, the roap:RORequest message is extended, where the italic part denotes extensions implemented in the present embodiment. It can be seen that the implemented extensions comprise: content identifier for identifying content for which the requested rights object serves, which is CN1000234 here; user account's new password hash message authentication code (HMAC) for authenticating the user account, just as denoted by the boldface part.

Upon receipt of the roap:RORequest message and after the successful validation of the DRM agent device with the device information, such as the device certificate chain as well the successful authentication of the user account with the new password, in case that conditions are met, the rights issuer acquires the rights object through checking the rights object space in accordance with the request message and specifically, the device identifier, the user identifier and the content identifier comprised in the request message.

The above conditions comprise that the registration is still in the term of validity; the acquisition times of the rights object is smaller than a pre-determined threshold, etc.

Next, the rights issuer sends the DRM agent device the acquired rights object. That is to say, the rights issuer sends to the DRM agent device a roap:ROResponse message (step s520).

The following codes depict an example of the roap:ROResponse message:

```xml
<?xml version="1.0" encoding="utf-8"?>
<roap:roResponse
    xmlns:roap="urn:oma:bac:dldrm:roap-1.0"
    xmlns:ds="http://www.w3.org/2000/09/xmldsig#"
    xmlns:xenc="http://www.w3.org/2001/04/xmlenc#"
    xmlns:o-ex="http://odrl.net/1.1/ODRL-EX"
    xmlns:o-dd="http://odrl.net/l.1/ODRL-DD"
    xmlns:xsi="http://www.w3.org/2001/XMLSchema-instance"
    status="Success">
        <deviceID>
            <keyIdentifier xsi:type="roap:X509SPKIHash">
                <hash>vXENc+Um/9/NvmYKiHDLaErK0gk=</hash>
            </keyIdentifier>
        </deviceID>
        <riID>
            <keyIdentifier xsi:type="roap:X509SPKIHash">
                <hash>aXENc+Um/9/NvmYKiHDLaErK0fk=</hash>
            </keyIdentifier>
        </riID>
        <nonce>32efd34de39sdwefqwer</nonce>
        <protectedRO>...</protectedRO>
```

```
        <certificateChain>
            <certificate>MIIB223121234567</certificate>
            <certificate>MIIB834124312431</certificate>
        </certificateChain>
        <ocspResponse>miibewqoidpoidsa</ocspResponse>
        <extensions>
            <extension xsi:type="roap:TransactionIdentifier">
                <id>09321093209-2121</id>
            </extension>
            <extension xsi:type="roap:UserID">
                <userID>Peter001CN-001</userID>
            </extension>
        </extensions>
        <signature>d93e5fue3susdskjhkjedkjrewh53209efoihfdse10ue2109ue1
        </signature>
</roap:roResponse>
```

As seen from the above codes, the roap:ROResponse message comprises: status, device ID, RI ID, device nonce, RO, RI certificate chain, OCSP response, extensions and signature.

In the present embodiment, the roap:ROResponse message is extended, where the italic part denotes extensions implemented in the present embodiment. It can be seen that the implemented extensions comprise user account identifier for identifying the receiver of the response message.

The following codes depict an example of a rights object:

```
<?xml version="1.0" encoding="UTF-8"?>
<roap:protectedRO
    xmlns:roap="urn:oma:bac:dldrm:roap-1.0"
    xmlns:ds="http://www.w3.org/2000/09/xmldsig#"
    xmlns:xenc="http://www.w3.org/2001/04/xmlenc#"
    xmlns:o-ex="http://odrl.net/1.1/ODRL-EX"
    xmlns:o-dd="http://odrl.net/1.1/ODRL-DD"
    xmlns:xsi="http://www.w3.org/2001/XMLSchema-instance">
    <ro id="n8yu98hy0e2109eu09ewf09u" domainRO="true" version="1.0"
        riURL="http://www.ROs-r-us.com">
        <riID>
            <keyIdentifier xsi:type="roap:X509SPKIHash">
                <hash>aXENc+Um/9/NvmYKiHDLaErK0fk=</hash>
            </keyIdentifier>
        </riID>
        <rights o-ex:id="REL1">
            <o-ex:context>
                <o-dd:version>2.0</o-dd:version>
                <o-dd:uid>n8yu98hy0e2109eu09ewf09u</o-dd:uid>
            </o-ex:context>
            <o-ex:agreement>
                <o-ex:asset>
                    <o-ex:context>
                        <o-dd:uid>CN1000234</o-dd:uid>
                    </o-ex:context>
                    <o-ex:digest>
                        <ds:DigestMethod Algorithm="http://www.w3.org/2000/09/
                            xmldsig#sha1"/>
                        <ds:DigestValue>bLLLc+Um/5/NvmYKiHDLaErK0fk=
                        </ds:DigestValue>
                    </o-ex:digest>
                    <ds:KeyInfo>
                        <xenc:EncryptedKey>
                        <xenc:EncryptionMethod
                            Algorithm="http://www.w3.org/2001/04/xmlenc#kw-aes128"/>
                        <xenc:CipherData>
                            <xenc:CipherValue>EncryptedCEK</xenc:CipherValue>
                        </xenc:CipherData>
                        </xenc:EncryptedKey>
                        <ds:RetrievalMethod URI="#K_MAC_and_K_REK"/>
                    </ds:KeyInfo>
                </o-ex:asset>
                <o-ex:permission>
                    <o-dd:play/>
                </o-ex:permission>
            </o-ex:agreement>
        </rights>
```

```
        <signature>
            <ds:SignedInfo>
                <ds:CanonicalizationMethod
                    Algorithm="http://www.w3.org/2001/10/xml-exc-c14n#"/>
                <ds:SignatureMethod
                    Algorithm="http://www.rsasecurity.com/rsalabs/pkcs/schemas/
                        pkcs-1#rsa-pss-default"/>
                <ds:Reference URI="#REL1">
                    <ds:DigestMethod Algorithm="http://www.w3.org/2000/09/
                        xmldsig#sha1"/>
                    <ds:DigestValue>j61wx3rvEPO0vKtMup4NbeVu8nk=
                    </ds:DigestValue>
                </ds:Reference>
            </ds:SignedInfo>
            <ds:SignatureValue>j6lwx3rvEPO0vKtMup4NbeVu8nk=
                </ds:SignatureValue>
            <ds:KeyInfo>
                <roap:X509SPKIHash>
                    <hash>aXENc+Um/9/NvmYKiHDLaErK0fk=</hash>
                </roap:X509SPKIHash>
            </ds:KeyInfo>
        </signature>
        <encKey Id="K_MAC_and_K_REK">
            <xenc:EncryptionMethod
                Algorithm="http://www.w3.org/2001/04/xmlenc#kw-aes128"/>
            <ds:KeyInfo>
                <roap:DomainIdentifier>Peter001CN-001
                </roap:DomainIdentifier>
            </ds:KeyInfo>
            <xenc:CipherData>
                <xenc:CipherValue>32fdsorew9ufdsoi09ufdskrew9urew
                    0uderty5346wq</xenc:CipherValue>
            </xenc:CipherData>
        </encKey>
    </ro>
    <mac>
        <ds:SignedInfo>
            <ds:CanonicalizationMethod
                Algorithm="http://www.w3.org/2001/10/xml-exc-c14n#"/>
            <ds:SignatureMethod
                Algorithm="http://www.w3.org/2000/09/xmldsig#hmac-sha1">
            <ds:Reference URI="#n8yu98hy0e2109eu09ewf09u">
                <ds:DigestMethod Algorithm="http://www.w3.org/2000/09/
                    xmldsig#sha1"/>
                <ds:DigestValue>j6lwx3rvEPO0vKtMup4NbeVu8nk=
                </ds:DigestValue>
            </ds:Reference>
        </ds:SignedInfo>
        <ds:SignatureValue>j61wx3rvEPO0vKtMup4NbeVu8nk=
        </ds:SignatureValue>
        <ds:KeyInfo>
            <ds:RetrievalMethod URI="#K_MAC_and_K_REK"/>
        </ds:KeyInfo>
    </mac>
</roap:protectedRO>
```

Sensitive information among the rights object, such as content decryption key, must be protected by the device key (included in the device certificate chain), user account key (user account's new password) or device and user account key (can be pre-defined).

It should be noted that in the present embodiment, there is a local table of rights objects of user account, device identifier and content identifier in the DRM agent device. When a DRM agent device acquires a rights object through the above process, stores the rights object in the table. When the DRM agent device needs to use content, first, the local rights objects table is searched so as to acquire a rights object for the content. If there is no valid rights object for the content in the local rights objects table, then the DRM agent device will trigger the above rights object acquisition process. Additionally, the DRM agent device can periodically query the rights issuer to synchronize rights objects in the local rights objects table thereof. Benefits from doing so are to lighten the burden on rights issuers and to support more new business modes.

After the rights object is acquired, the DRM agent device decrypts the content with key in the rights object and uses the content under the control of the rights object.

Figure 6:
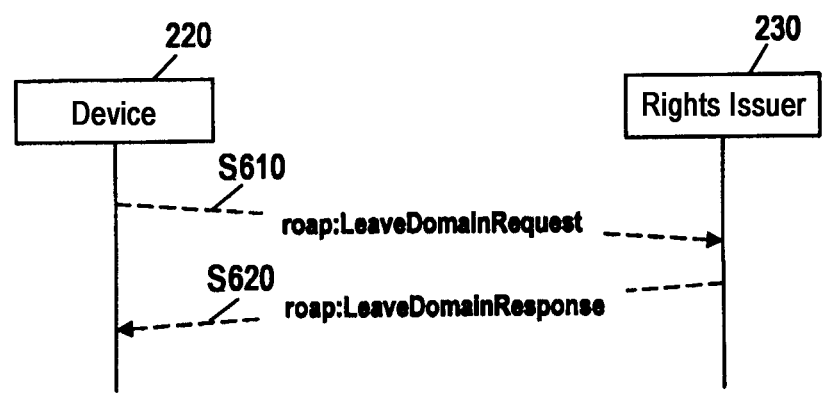
FIG. 6 depicts a signal flow view of a deregistration process according to an embodiment of the present invention.

FIG. 6 depicts a signal flow view of a deregistration process according to an embodiment of the present invention. As shown in FIG. 6, the deregistration process comprises two steps between one of the DRM agent devices 220 and one of the rights issuers 230. In the present embodiment, OMA 2-pass Leave Domain Protocol is utilized to implement the deregistration process.

Following the registration, deregistration can also be implemented in accordance with needs. That is to say, a relationship among a user account, a DRM agent device and a rights issuer can be removed from the DRM agent device and the rights issuer.

First, the DRM agent device sends to the rights issuer a roap:LeaveDomainRequest message (step S610).

The following codes depict an example of the roap: LeaveDomainRequest message:

```
<?xml version="1.0" encoding="utf-8"?>
<roap:leaveDomainRequest
    xmlns:roap="urn:oma:bac:dldrm:roap-1.0"
xmlns:xsi="http://www.w3.org/2001/XMLSchema-instance"
    triggerNonce="sdfknjvfda438790fdjkl4rq">
        <deviceID>
            <keyIdentifier xsi:type="roap:X509SPKIHash">
                <hash>vXENc+Um/9/NvmYKiHDLaErK0gk=</hash>
            </keyIdentifier>
        </deviceID>
        <riID>
            <keyIdentifier xsi:type="roap:X509SPKIHash">
                <hash>aXENc+Um/9/NvmYKiHDLaErK0fk=</hash>
            </keyIdentifier>
        </riID>
        <nonce>32efd34de39sdwefqwer</nonce>
        <time>2004-03-17T19:20:00Z</time>
        <domainID>Peter001CN-001</domainID>
        <certificateChain>
            <certificate>miib123121234567</certificate>
            <certificate>miib234124312431</certificate>
        </certificateChain>
        <extensions>
            <extension xsi:type="roap:PasswordHash">
                <hash>41ebHkfyc1KfD5KUU+k5po7en9E=</hash>
            </extension>
        </extensions>
    <signature>321ue3ue3ue10ue2109ue1ueoidwoijdwe309u09ueqijdwqijdwq09
        uwqwqi009</signature>
</roap:leaveDomainRequest>
```

As seen from the above codes, the roap:LeaveDomainRequest message comprises: device ID, RI ID, device nonce, deregistration request time, domain ID (user account), device certificate chain, extensions and signature.

In the present embodiment, the roap:LeaveDomainRequest message is extended, where the italic part denotes extensions implemented in the present embodiment. It can be seen that the implemented extensions comprise: user account's old password hash for authenticating the user account.

Upon receipt of the roap:LeaveDomainRequest message, the rights issuer authenticates the user account with the user account's password hash in the message, and validates the DRM agent device with the device information, such as the device certificate chain. After the successful authentication and validation, in case that conditions are met, the rights issuer deregisters the DRM agent device and the user account. In other words, a relationship among the user account, the DRM agent device and the rights issuer is eliminated.

The above conditions comprise that the times of deregistration among the user account, the DRM agent device and the rights issuer is smaller than a pre-determined threshold.

Next, the rights issuer confirms completion of the deregistration to the DRM agent device, i.e., sends to the DRM agent device a roap:LeaveDomainResponse message (step s620).

The following codes depict an example of the roap:LeaveDomainResponse message:

```
<?xml version="1.0" encoding="utf-8"?>
<roap:leaveDomainResponse
    xmlns:roap="urn:oma:bac:dldrm:roap-1.0"
    xmlns:xsi="http://www.w3.org/2001/XMLSchema-instance"
    status="Success">
        <nonce>32efd34de39sdwefqwer</nonce>
        <domainID>Peter001CN-001</domainID>
        <extensions>
            <extension xsi:type="roap:Signature">
                <signature>cnaidhf87y873t0rekvmwov89rrRGWtw/fw+jqenfnac0mf8
                re75ninfa8hcadnf</signature>
            </extension>
            <extension xsi:type="roap:CertificateChain">
                <certificate>MIIB223121234567</certificate>
                <certificate>MIIB834124312431</certificate>
            </extension>
                <extension xsi:type="roap:OCSPResponse">
                <ocspResponse>miibewqoidpoidsa</ocspResponse>
            </extension>
        </extensions>
</roap:leaveDomainResponse>
```

As seen from the above codes, the roap:LeaveDomainResponse message comprises: status, device nonce, domain ID (user account) and extensions.

In the present embodiment, the roap:LeaveDomainResponse message is extended, where the italic part denotes extensions implemented in the present embodiment. It can be seen that the implemented extensions comprise: integrity information for checking the message's integrity, including message's signature, RI certificate chain and certificate's OCSP response.

Upon receipt of the roap:LeaveDomainResponse message, the DRM agent device removes all the related information in the local, which includes a relationship among the user account, the DRM agent device and the rights issuer and the above new password sent to the DRM agent device via registration.

It should be noted that in the present embodiment, the deregistration process updates the device status. Moreover, if there is device status information transmitted to the rights issuer during the deregistration process, the rights issuer should validate these information and then record them.

The device status refers to usage status of the DRM agent device in the DRM system, which includes: device belonging, expiration time, content usage records, etc.

(1) Device belonging: describes user accounts with which the device is currently registered and user accounts with which the device was registered. As described previously, one identical DRM agent device can belong to a plurality of user accounts at the same time. Recording of user accounts with which the device was registered is to restore the device status after re-registration.

(2) Expiration time: describes the DRM agent device's term of validity. Only the registered DRM agent device is within the term of validity, can it be used normally, and expiring DRM agent devices must be updated (re-registered) in order to be used normally again.

(3) Content usage records: describe usage conditions of different contents on the DRM agent device. The recorded information comprises: usage times, usage time, usage duration and the like. This information can be used for monitoring implementation conditions of the DRM agent device to control the use of contents.

Figure 7:
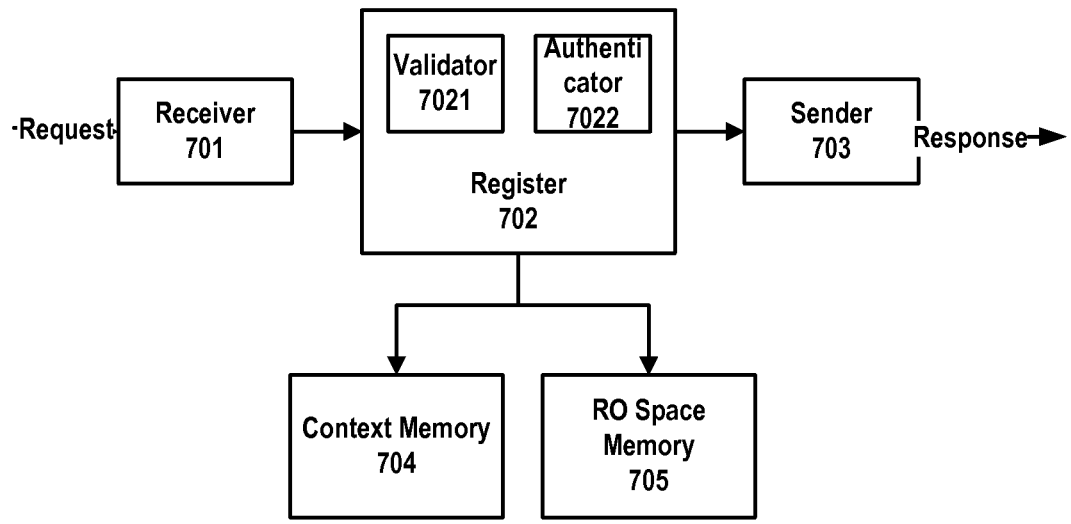
FIG. 7 depicts a schematic layout view of an apparatus for digital rights management according to an embodiment of the present invention.

FIG. 7 depicts a schematic layout view of an apparatus for digital rights management according to an embodiment of the present invention. The apparatus as shown in FIG. 7 can be a constituent component of any rights issuer server.

As shown in FIG. 7, the apparatus for digital rights management comprises: a receiver 701, a register 702, a sender 703, a context memory 704 and a rights object space memory 705, among which register 702 further comprises a validator 7021 and an authenticator 7022.

Context memory 704 is used for storing an established relationship among a user account, a DRM agent device and a rights issuer. Obviously, the relationship mentioned here refers to the many-to-many relationship among DRM entities. Different expressions and different storage modes of the many-to-many relationship do not constitute limitations on the present invention.

Receiver 701 is used for receiving a registration request from one of a plurality of DRM agent devices (not shown in the figure). The registration request is used for requesting to register one of a plurality of user accounts and the one DRM agent device to one of a plurality of rights issuers (which can be the rights issuer comprising the apparatus as shown in FIG. 7).

Register 702 is used for, in response to the registration request, completing the registration process in the one rights issuer, including establishment of a relationship among the one user account, the one DRM agent device and the one rights issuer and storing of the relationship to context memory 704.

Sender 703 is used for returning a registration completion response to the DRM agent device which made the request.

Validator 7021 is used for validating DRM agent devices.

Authenticator 7022 is used for authenticating user accounts.

Please refer to the foregoing description taken in conjunction with FIGS. 3, 5 and 6, for the detailed validation and authentication process.

When a plurality of DRM agent devices are bound to one user account under one rights issuer, the one user account is treated as an OMA domain.

Moreover, register 702 terminates the registration process if the number of DRM agent devices that are registered with a user account is larger than or equal to a pre-determined value.

Rights object space memory 705 is used for storing rights object space defined by a plurality of user accounts, a plurality of DRM agent devices and contents with respect to a rights issuer, just as shown in FIG. 4.

Additionally, receiver 701 is further used for receiving a request for content rights object acquisition from a DRM agent device.

Sender 703 is further used for returning the content rights object to the DRM agent device, in the case that the content rights object exists in rights object space memory 705.

Furthermore, receiver 701 is further used for receiving a deregistration request from one of a plurality of DRM agent devices. The deregistration request is used for requesting to deregister one of a plurality of user accounts and the one DRM agent device from one of a plurality of rights issuers.

Register 702 is further used for, in response to the deregistration request, completing the deregistration process in the one rights issuer, including removal of the relationship among the one user account, the one DRM agent device and the one rights issuer and updating of context memory 704.

Sender 703 is further used for returning a deregistration completion response to the one DRM agent device.

Validator 7021 and authenticator 7022 also work in the deregistration process.

Moreover, register 702 terminates the deregistration process if the deregistration times of the one DRM agent device under the one user account is larger than or equal to a pre-determined value.

Figure 8:
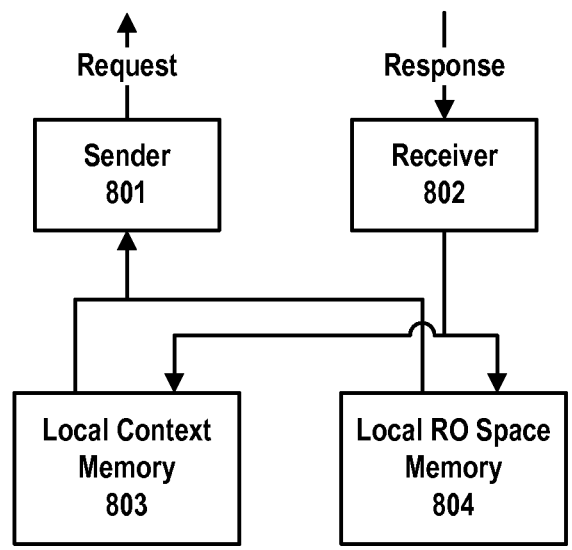
FIG. 8 depicts a schematic layout view of an apparatus for digital rights management according to an embodiment of the present invention.

FIG. 8 depicts a schematic layout view of an apparatus for digital rights management according to the present invention, which apparatus can be a constituent component of any DRM agent device. As shown in FIG. 8, the apparatus for digital rights management comprises: a sender 801, a receiver 802, a local context memory 803, a local rights object space memory 804 and known parts that are not shown here.

Sender 801 is used for sending a registration request to one of a plurality of rights issuers. The registration request is used for requesting to register one of a plurality of user accounts and one of a plurality of DRM agent devices to the one rights issuer.

Receiver 802 is used for, upon receipt of a registration completion response from said one rights issuer, establishing in the local relationship among said one user account, the one DRM agent device and the one rights issuer. This relationship can be stored in local context memory 803.

When a plurality of DRM agent devices are bound to one user account under one rights issuer, the one user account is treated as an OMA domain.

Sender 801 is further used for sending a request for content rights object acquisition to the one rights issuer.

Receiver 802 is further used for, upon receipt of the content rights object, updating the rights object space stored in the local. The rights object space is stored in, for example local rights object space memory 804.

Sender 801 is further used for sending a deregistration request to one of a plurality of rights issuers. The deregistration request is used for requesting to deregister one of a plurality of user accounts and one of a plurality of DRM agent devices from the one rights issuer.

Receiver 802 is further used for, upon receipt of a deregistration completion response from the one rights issuer, removing in the local (e.g. in local context memory 803) the relationship among the one user account, the one DRM agent device and the one rights issuer.

Figure 9:
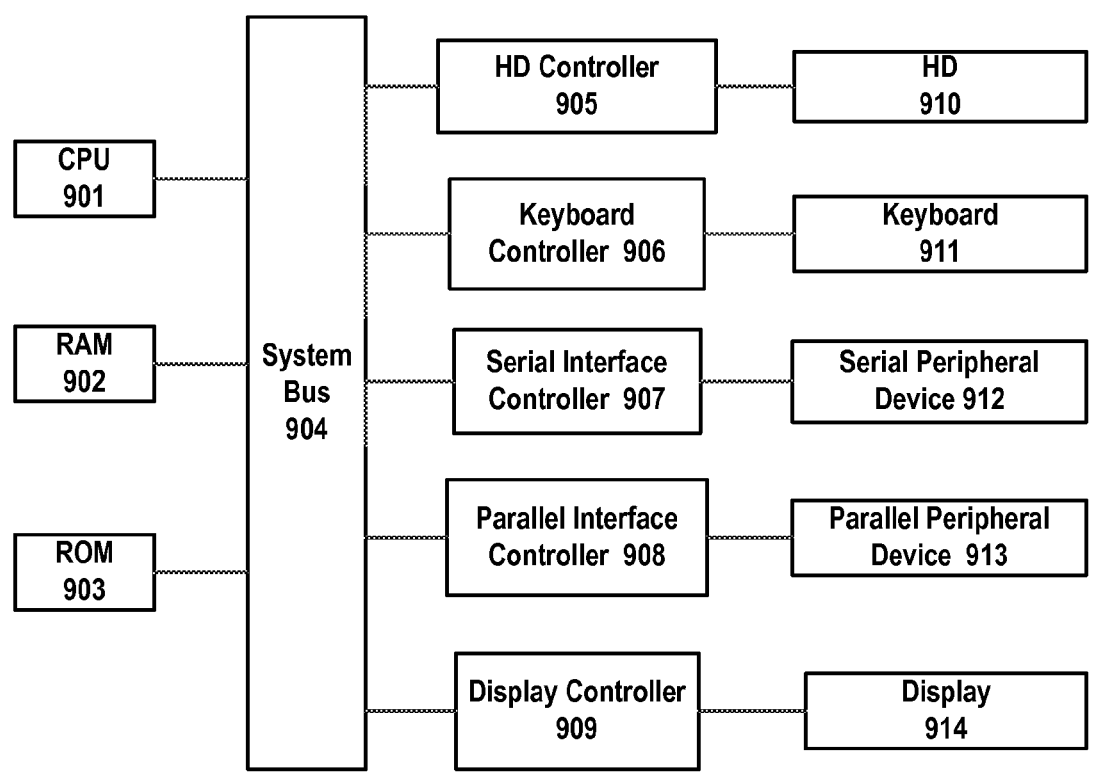
FIG. 9 schematically depicts a computer system in which embodiments of the present invention can be implemented.

FIG. 9 schematically depicts a computer system in which the present invention can be implemented. The architecture as shown in FIG. 9 can be used for implementing a rights issuer server or a DRM agent device. The computer system as shown in FIG. 9 comprises: a CPU (central processing unit) 901, a RAM (random access memory) 902, a ROM (read-only memory) 903, a system bus 904, an HD (hard disc) controller 905, a keyboard controller 906, a serial interface controller 907, a parallel interface controller 908, a display controller 909, a hard disc 910, a keyboard 911, a serial peripheral device 912, a parallel peripheral device 913 and a display 914. Among these parts, connected with system bus 904 are CPU 901, RAM 902, ROM 903, HD controller 905, keyboard controller 906, serial interface controller 907, parallel interface controller 908 and display controller 909. Hard disc 910 is connected with HD controller 905, keyboard 911 is connected with keyboard controller 906, serial peripheral device 912 is connected with serial interface controller 907, parallel peripheral device 913 is connected with parallel interface controller 908, and display 914 is connected with display controller 909.

The function of each of the parts in FIG. 9 is well known in the present technical field, and the structure shown in FIG. 9 is also conventional. Such a structure is applied to both personal computers and handheld devices, such as Palm PC, PDA (personal digital assistant), mobile phone and the like. Some parts shown in FIG. 9 may be omitted in different applications. The entire system shown in FIG. 9 is controlled by computer readable instructions that are usually stored as software in hard disc 910, EPROM or other non-volatile memory. The software may be downloaded from a network (not shown in the figure). The software downloaded from a network or stored in hard disc 910 may be loaded to RAM 902 and executed by CPU 901, so as to perform the function determined by the software.

While the computer system shown in FIG. 9 is able to support the method and apparatus for digital rights management according to the present invention, the computer system merely serves as an example of computer systems. Those skilled in the art may understand that various other computer system designs are also able to carry out the embodiments of the present invention.

The present invention may further be implemented as a computer program product used by, for example the computer system shown in FIG. 9, which product contains codes for implementing the method for digital rights management according to the present invention. The codes may be stored in a memory of other computer system prior to the usage. For instance, the codes may be stored in a hard disc or a removable memory such as an optical disc or a soft disc, or may be downloaded via the Internet or other computer network.

The concept of the present invention can be implemented by means of a suitably programmed rights issuer provided with a computer program. A computer program of supporting the many-to-many relationships among entities in a DRM system comprises: codes for receiving a message used for registration, said message used for registration coming from one of a plurality of DRM agent devices to register one of a plurality of user accounts and said one DRM agent device to one of a plurality of rights issuers; codes for successfully completing said registration to thereby establish relationship among said one user account, said one DRM agent device and said one rights issuer; and codes for sending a message used for confirming completion of said registration.

The concept of the present invention can be implemented by means of a suitably programmed DRM agent device provided with a computer program. A computer program of supporting the many-to-many relationships among entities in a DRM system comprises: codes for sending a message used for registration, said message used for registration going to one of a plurality of rights issuers to register one of a plurality of user accounts and one of a plurality of DRM agent devices to said one rights issuer; and codes for receiving a message used for confirming completion of said registration to thereby establish a relationship among said one user account, said one DRM agent device and said one rights issuer.

Such computer program products can be stored in a storage carrier.

It should be noted that in order to facilitate easier understanding of the present invention, more particular technical details have been omitted in the foregoing description, which are well known to those skilled in the art and might be indispensable to implementations of the present invention.

The description of the present invention has been presented for purposes of illustration and description, and is not intended to be exhaustive or limited to the invention in the form disclosed. Many modification and variation will be apparent to those of ordinary skilled in the art. The embodiment was chosen and described in order to best explain the principles of the invention, the practical applications thereof, and to enable those of ordinary skill in the art to understand that all modifications and alterations made without departing from the spirit of the present invention fall into the protection scope of the present invention as defined in the appended claims.

What is claimed is:

1. A method for digital rights management (DRM) for a computer having at least one processing device, the method comprising:
    sending, by the at least one processing device, a registration request to a first right issuer from a plurality of rights issuers, said registration request being used for requesting to register one of a plurality of user accounts and one of a plurality of DRM agent devices to said first right issuer as part of a domain, a second DRM agent device from said plurality of DRM agent devices being registered to said first rights issuer using said one user account as part of said domain;
    determining that a first registration completion response from the first right issuer is indicative that a number of DRM agent devices registered with said one user account is less than or equal to a predetermined value;
    in response to the first registration completion response, receiving and storing, by the at least one processing device, a rights object that is associated with a triplet comprising respective identifiers of said one user account, said one DRM agent device and a DRM protected content as part of said domain associated with said one user account, said rights object comprising encryption information to access the DRM protected content;

sending, by the at least one processing device, another registration request to a second right issuer from the plurality of rights issuers, said another registration request being used for requesting to register said one user account and said one DRM agent device to said second right issuer;

determining that a second registration completion response from the second right issuer is indicative that the number of DRM agent devices registered with said one user account exceeds the predetermined value;

terminating, by the at least one processing device, said second registration request in response to the second registration completion response; and accessing said DRM protected content by said one DRM agent device using said rights object by sending, by said one DRM agent device, a request for authorization for accessing said DRM protected content, the request including said rights object that is associated with the triplet comprising respective identifiers of said one user account, said one DRM agent device, and said DRM protected content.

2. The method according to claim 1, further comprising the steps of:

updating a rights object space stored in a local memory in the case that said rights object is received.

3. An apparatus for digital rights management (DRM) having at least one processing device for implementing program components comprising:

a sender component for sending a registration request to a first rights issuer from a plurality of rights issuers, said registration request being used for requesting to register one of a plurality of user accounts and one of a plurality of DRM agent devices to said first rights issuer as part of a domain, said apparatus being said one DRM agent device from said plurality of DRM agent devices; and a receiver component for:

receiving a registration completion response from said first rights issuer, in response to a number of DRM agent devices registered with said one user account being less than a predetermined value, and terminating said registration request in response to a registration response from said first rights issuer being indicative that the number of DRM agent devices registered with said one user account is not less than the predetermined value;

in response to said registration completion response, receiving and storing a rights object that is associated with a triplet comprising respective identifiers of said one user account, said one DRM agent device, and a DRM protected content as part of said domain associated with said one user account, said rights object comprising encryption information to access the DRM protected content; and the sender component accessing said DRM protected content using said rights object by sending a request to a server storing said DRM protected content for authorization for accessing said DRM protected content, the request including said rights object that is associated with the triplet comprising respective identifiers of said one user account, said one DRM agent device, and said DRM protected content.

* * * * *